United States Patent [19]

Krauss

[11] Patent Number: 4,865,727
[45] Date of Patent: Sep. 12, 1989

[54] NEW AND USED OIL FILTER CONTAINER WITH USED FILTER REMOVING MEANS

[76] Inventor: Leonard Krauss, 4204 Melisa Ct., Carmichael, Calif. 95608

[21] Appl. No.: 942,284

[22] Filed: Dec. 16, 1986

[51] Int. Cl.4 ............................................. B01D 27/00
[52] U.S. Cl. .................................... 210/168; 210/238; 210/248; 210/541; 210/DIG. 17; 81/121.1
[58] Field of Search ............... 210/168, 238, 244, 248, 210/470, 541, 542, DIG. 17; 81/3.4, 3.44, 53.2, 64, 90.2, 119, 121.1; 123/198 R, 198 E; 220/85 H; D23/4

[56] References Cited

U.S. PATENT DOCUMENTS

| | | | |
|---|---|---|---|
| 3,473,666 | 10/1969 | Humbert, Jr. | 210/232 |
| 3,853,026 | 12/1974 | Rhodes | 81/90.2 |
| 4,266,452 | 5/1981 | Crist | 81/124.7 |
| 4,364,829 | 12/1982 | Atkins et al. | 210/541 |
| 4,376,703 | 3/1983 | Krauss | 210/248 |
| 4,451,368 | 5/1984 | Pandelena et al. | 210/248 |
| 4,507,199 | 3/1985 | Carlisle | 210/238 |
| 4,642,183 | 2/1987 | Hebert | 210/248 |
| 4,643,053 | 2/1987 | Rhodes | 81/3.44 |

Primary Examiner—Richard V. Fisher
Assistant Examiner—Coreen Y. Lee
Attorney, Agent, or Firm—Fleit, Jacobson, Cohn, Price, Holman & Stern

[57] ABSTRACT

A tubular body having an open and closed ends is provided for loosely receiving a conventional screw-on oil filter therein. The tubular body open end is structured to form a fluid tight seal with the outwardly facing surface of a filter mounting location and the tubular body includes a circumferentially extending zone which is accordion pleated and yieldingly axially compressible. The inner surfaces of the tubular body, at the closed end thereof, are structured to at least reasonably non-slip engage the outer surfaces of the closed end of a filter disposed within the tubular body whereby rotational torque applied to the closed end of the tubular body will be transferred to the filter. The open end of the tubular body is provided with a removable cover and the covered tubular body may comprise a container for marketing a new oil filter and thereafter containing a used oil filter for facilitating disposal thereof.

9 Claims, 1 Drawing Sheet

NEW AND USED OIL FILTER CONTAINER WITH USED FILTER REMOVING MEANS

BACKGROUND OF THE INVENTION

1. Field of the Invention

This invention relates to a cup-shaped receptacle including a removable cover therefore and in which a spin-on oil filter may be received The interior of the closed end of the receptacle includes structure for facilitating a strong torque transfer grip on an oil filter and the receptacle includes a circumferentially extending yieldingly axially compressible portion and the open end of the receptacle defines a seal surface for establishing a fluid tight seal with an outwardly facing surface of an oil filter mounting location.

2. Description of Related Art

Various different forms of oil filter changing facilitating devices, covers, receptacles and sealing structures including some of the general structural and operational features of the instant invention are disclosed in U.S. Pat. Nos. 2,529,167, 2,568,196, 2,948,452, 3,257,025, 3,836,041, 3,973,549, 3,982,571, 4,031,930, 4,214,614, 4,276,162, 4,376,703 and 4,451,368. However, these previously patented devices do not include the overall combination of structural features of the instant invention which particularly well adapt the invention for use not only as a protective enclosure for a new oil filter, but also as a tool for removing a used oil filter, a receptacle for receiving a used oil filter and a tool for facilitating removal of a used oil filter with a minimum amount of oil spillage.

U.S. Pat. Nos. 4,376,703 and 4,451,368 clearly disclose an apparatus for facilitating changing an oil filter with a minimum of oil spillage, but which does not also facilitate, to the extent afforded by the instant invention, the loosening of an overtight used oil filter and which further does not comprise a protective closure for a new oil filter as well as a receptacle for containing a used oil filter and the oil contained therein for discard purposes.

The container of the instant invention comprises a generally cylindrical container body open at one end and closed at its other end. The interior of the closed end of a first form includes projection means for nonslip torque transfer engagement with recesses formed in and about the closed end of an oil filter, a cover is provided for the open end of the container body whereby a new oil filter may be marketed within the container body and sealingly closed therein against contamination and a used oil filter and the attendant used oil may be sealingly closed within the container body after removal of the used oil filter and during disposal thereof. Also, the container body includes a peripherally extending yieldingly axially compressible zone and the open end of the body includes a structure defining a seal surface for establishing a fluid tight seal with an oil filter mounting location.

The main object of this invention is to provide a multi-function apparatus capable of greatly facilitating the changing of an oil filter by a typical automotive driver not equipped with special tools for overtight used filter removal, automotive jacking structure for providing ready access to an oil filter mounting location from beneath an automobile, and an immediately available trash disposal system with the capacity to handle proper disposal of used oil.

Another object of this invention is to provide a container in which a new oil filter may be marketed and stored against contamination until installation thereof.

Still another important object of this invention is to provide an apparatus enabling greater manual torque to be applied to an overtight used oil filter for effecting removal thereof.

A further object of this invention is to provide an apparatus which will enable removal of a generally horizontally disposed oil filter of the spin-on type with a minimum amount of oil spillage.

Yet another object of this invention is to provide a container for effecting ready disposal of a used oil filter and the attendant used engine oil.

A final object of this invention to be specifically enumerated herein is to provide an apparatus in accordance with the preceding objects and which will conform to conventional forms of manufacture, be of simple construction and easy to use so as to provide a device that will be economically feasible, longlasting, and relatively troublefree in operation.

These together with other objects and advantages which will become subsequently apparent reside in the details of oonstruction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 3:
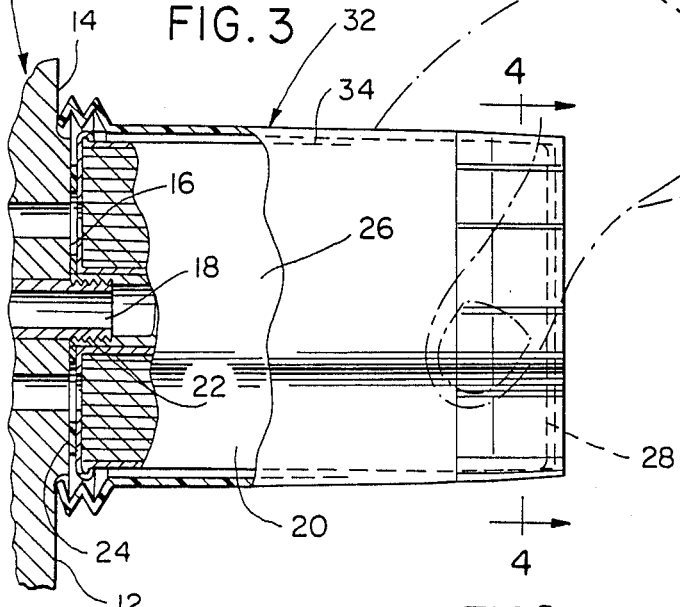
FIG. 3 is a side elevational view of the apparatus of the instant invention in use immediately prior to the utilization thereof to remove a used oil filter, portions of the apparatus, used oil filter and oil filter mounting location being broken away and illustrated in vertical section.
Figure 4:
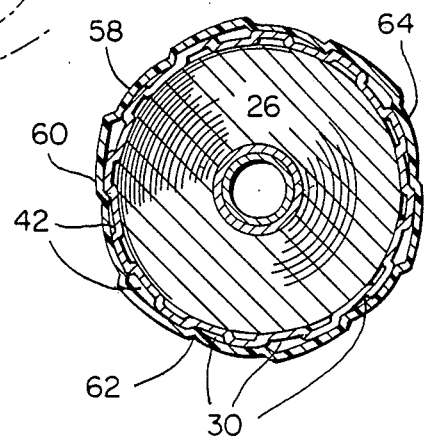
FIG. 4 is a vertical sectional view taken substantially upon the plane indicated by the section line 4—4 of FIG. 3.

Referring now more specifically to FIG. 3, the numeral 10 generally designates a conventional form of combustion engine incorporating an oil filter mounting location 12 defining parallel planar mounting surfaces 14 and 16. The mounting surface 16 is generally annular and includes an externally threaded pipe end 18 projecting outwardly from the central portion thereof. The mounting surface 14 also is annular and is disposed outwardly of the mounting surface 16 as may be seen in FIG. 3, a used oil filter 20 having its open end threadedly engaged with the pipe end 18 as at 22 and an annular seal 24 establishes a fluid tight seal between the oil filter 20 and the mounting surface 16 about the pipe end 18. Furthermore, the oil filter 20 includes a generally cylindrical body 26 closed at one end as at 28 and open at its remote end opposing the mounting surface 16. The closed end 28 includes circumferentially spaced recesses 30, see FIG. 4 formed therein. All of the foregoing description comprises that of a conventional spin-on type oil filter.

Figure 1:
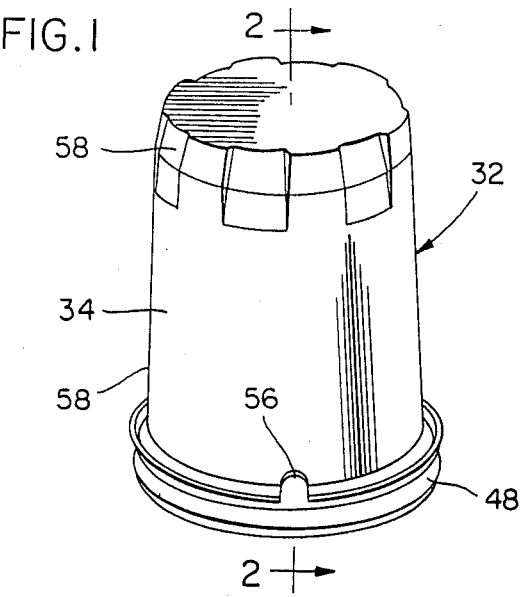
FIG. 1 is a perspective view of the apparatus of the instant invention in a closed condition enclosing an unused engine oil filter therein.
Figure 2:
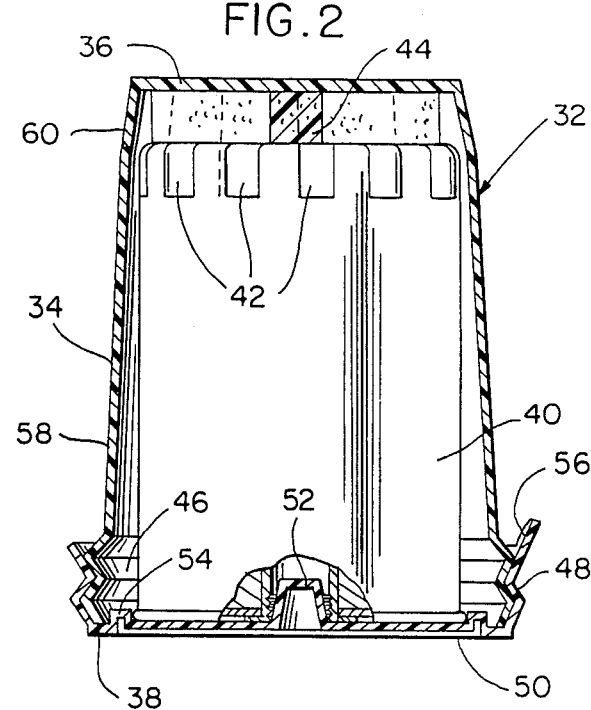
FIG. 2 is an enlarged vertical sectional view taken substantially upon the plane indicated by the section line 2—2 of FIG. 1.

With attention now invited more specifically to Figs. 1 and 2, the numeral 32 generally designates the container of the instant invention. The container 32 comprises a generally cylindrical container body 34 closed at one end by an endwall 36 and open at its other end 38.

The numeral 40 designates a new oil filter for replacing the oil filter 20 and the oil filter 40 includes recesses 42 corresponding to the recesses 30.

Figure 5:
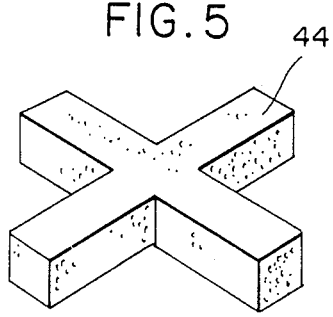
FIG. 5 is a perspective view of a cruciform shaped spacer for utilization when the apparatus is to be used as a container for a new oil filter.

It may be seen from FIG. 2 that the oil filter 40 is of an axial length somewhat less than the axial length of the container body 34 and that a cruciform spacer 44 (see FIG. 5) is disposed within the container body 34 between the closed end of the new oil filter 40 and the inner surface of the endwall 30. Also, the end portion of the body 34 remote from the endwall 36 includes an axially compressible and circumferentially extending accordion pleated portion or section 46 over which a similarly accordion pleated circumferential skirt portion 48 of a closure cap 50 is snap engageable for sealingly closing the open end 38 of the container body 34 against contamination of the new oil filter 40 within the container 32. The closure cap 50 includes a center inwardly directed projection 52 for reception within the pipe end of the oil filter 40 corresponding to the pipe end 18 and the closure cap 50 further includes an inwardly projecting annular curb 54 for snugly embracingly receiving the open end of the oil filter therein, the skirt portion 48 including an integral pull tab 56 for facilitating removal of the closure cap 50.

The peripheral walls 58 of the container body 34 are slightly divergent toward the open end 38 and are more sharply inwardly convergent as at 60 toward and immediately adjacent the endwall 36. In addition, the inwardly convergent portions 60 define circumferentially spaced inwardly projecting abutments 62 which are axially engageable with the recesses 42 upon removal of the spacer 44 and displacement of the endwall 36 toward the closed end of the oil filter 40. The abutments 62 engage the recesses 42 in a manner functioning as coacting torque transfer means facilitating counterclockwise turning of the oil filter 40 by applying counterclockwise torque to the container 32. The inwardly convergent portions of 60 of the peripheral wall 58 is of constant thickness and, accordingly, in addition to the inwardly projecting abutments 62, the inwardly convergent peripheral wall portions 60 also define outwardly opening recesses 64 which facilitate manual gripping of the container 32 and the manual application of rotary torque thereto.

The container 32 comprising the container body 34, the closure cover 50 and the spacer 44 may be inexpensively manufactured and utilized as a packaging container for the new oil filter. Although the container body 34 is longer than the new oil filter 40, the spacer 44 occupies the remaining length of the container body 34.

When it is desired to remove the old oil filter, it is first loosened with a filter wrench. The closure cap 50 is removed and the new oil filter and spacer 44 are removed from the container body 34. Then, the container body 34 is telescoped over the used oil filter 20 in the manner illustrated in FIG. 3 of the drawings with axial pressure applied to the container body 34 in order to rotatably seal the open end 38 with the mounting surface 14 and to axially compress the accordion pleated section 46 and shift the endwall 36 to a position at least closely opposing closed end 48 of the body 26. With the container 36 thus positioned, the abutments 62 engage the recesses 30 in the manner illustrated in FIG. 4 in order to enable counterclockwise torque applied to the container body 34 to be transferred in a non-slip manner to the body 26 of the used oil filter 20 for effecting removal thereof. As the body 26 of the used oil filter 20 is rotated in a counterclockwise direction, the axially yieldable accordion pleated section 46 maintains a fluid tight seal of the open end 38 with the mounting surface 14 until such time as the oil filter 20 is completely unthreaded from the pipe end 18. At this point, the container 32 and the oil filter 20 therein may be quickly angularly displaced to an upright position whereby leakage of used oil down the mounting surfaces 16 and 14 will be maintained at a minimum.

After removal of the oil filter 26, the closure cap 50 may be resecured over the open end 58 of the container body 34. This will maintain the used oil filter 20 and the oil remaining therein confined within the container 32 until such time as the latter and its contents may be disposed of in an approved manner.

Of course, after removal of the used oil filter 20, the new oil filter 40 (previously removed from the container 32) may be threaded onto the pipe end 18.

Figure 6:
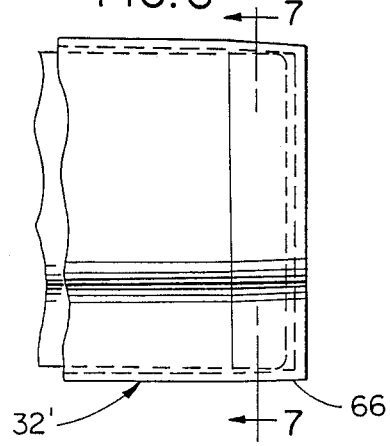
FIG. 6 is a fragmentary side elevational view similar to the righthand portion of FIG. 3 illustrating a slightly modified form of the invention.
Figure 7:
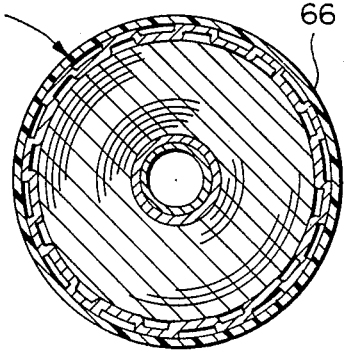
FIG. 7 is a vertical sectional view taken substantially upon the plane indicated by the section line 7—7 of FIG. 6.

With attention now invited more specifically to Figs. 6 and 7, there will be seen a modified form of container referred to in general by the reference numeral 32'. The container 32' is substantially identical to the container 32, except that the inwardly convergent endwall portions 66 thereof are frustoconical on both the inside and the outside of the container 32'. However, by tightly axially displacing the container 32' into position with the inwardly convergent wall portions 66 tightly frictionally engaging the corresponding filter end, adequate torque usually may be applied to the container 32' in order to loosen an associated used oil filter from its mounted position illustrated in FIG. 3.

The containers 32 and 32' each may include a regular accordion pleated section such as section 46, or an accordion pleated section which is convoluted, in which instance the skirt portion of the associated cover also would be accordion pleated in a convoluted manner. Also, the containers may be accordion pleated intermediate their opposite ends or adjacent the closed ends thereof if the cover is not needed, or in addition to the accordion pleated section at the open end of the container if the cover is retained. Further, the side walls of the containers need not be longitudinally straight and may be outwardly bowed, either in addition to or in lieu of an accordion pleated section.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, failing within the scope of the invention.

What is claimed is:

1. In combination with a screw-on type oil filter including a generally cylindrical body having first and second ends and including first threaded connecting means at said first end for threaded connection with and unthreading connection from an oil filter mounting location including second threaded connecting means to be threadedly engaged by said first threaded connecting means, an oil catching and retaining container, said container including a tubular body having a first open end and a second closed end, said container being loosely removably telescopingly engaged over and readily rotatable relative to said cylindrical body from the second end thereof with said container body first end spaced outward from said cylindrical body first end and said container body second end spaced closely outward of said cylindrical body second end, said cylindrical body second end and said tubular body second end including coacting torque transfer means operatively engageable with and disengageable from each other upon shifting of said tubular body second end toward and away from, respectively, said cylindrical body second end and operable, only when operatively engaged with search other, to transfer rotational torque applied to said tubular body to said cylindrical body, said open first end of said tubular body including seal means for forming a fluid tight seal with oil filter mounting location, said tubular body being constructed of fluid imperious material and including a yieldingly axially compressible circumferentially extending portion thereof intermediate said first and second ends thereof.

2. The filter and tubular body combination of claim 1 including a closure cover removably securable over the first open end of said tubular body.

3. The filter and tubular body combination of claim 2 wherein said first end of said filter includes a central outwardly opening internally threaded hollow portion, said closure cover including a central inwardly projecting projection snugly receivable in said hollow portion.

4. The filter and tubular body combination of claim 3 wherein said yieldingly axially compressible portion comprises a circumferentially extending accordion pleated section of said tubular body closely adjacent said first open end thereof and with which a peripheral skirt portion of said closure cover is snap fittingly engaged.

5. The filter and tubular body combination of claim 2 wherein said closure cover includes an annular inwardly projecting curb within the confines of which said first end of said cylindrical body is seatingly received.

6. The filter and tubular body combination of claim 5 wherein said first end of said filter includes a central outwardly opening internally threaded hollow portion, said closure cover including a central inwardly projecting projection snugly receivable in said hollow portion.

7. The filter and tubular body combination of claim 2 including a spacer removably interposed between the closed ends of said cylindrical and tubular bodies.

8. The filter and tubular body combination of claim 1 wherein said torque transfer means includes circumferentially spaced recesses on said closed end of said cylindrical body and inwardly projecting abutments on the closed end of said tubular body seatingly received in said recesses.

9. The filter and tubular body of claim 1 wherein said second end of said tubular body includes inwardly facing wedge surfaces wedgingly engageable with the opposing outer peripheral surfaces of said cylindrical body.

* * * * *